(12) United States Patent
Chester et al.

(10) Patent No.: US 9,864,757 B1
(45) Date of Patent: Jan. 9, 2018

(54) CONTENT BASED SYSTEMS AND METHODS FOR CONDUCTING SPECTRUM COLOR BASED IMAGE SEARCH

(71) Applicant: SHUTTERSTOCK, INC., New York, NY (US)

(72) Inventors: David Chester, Brooklyn, NY (US); Wyatt Jenkins, Brooklyn, NY (US); Andrew Rodland, East Rutherford, NJ (US); Eric Smiling, Jersey City, NJ (US); Chris Becker, New York, NY (US)

(73) Assignee: SHUTTERSTOCK, INC., New York, NY (US)

( * ) Notice: Subject to any disclaimer, the term of this patent is extended or adjusted under 35 U.S.C. 154(b) by 6 days.

(21) Appl. No.: 15/403,385

(22) Filed: Jan. 11, 2017

Related U.S. Application Data

(63) Continuation of application No. 14/205,429, filed on Mar. 12, 2014.

(60) Provisional application No. 61/782,522, filed on Mar. 14, 2013.

(51) Int. Cl.
*G06K 9/00* (2006.01)
*G06F 17/30* (2006.01)
(Continued)

(52) U.S. Cl.
CPC .... *G06F 17/3025* (2013.01); *G06F 17/30268* (2013.01); *G06K 9/4642* (2013.01); *G06K 9/4652* (2013.01); *G06T 3/40* (2013.01)

(58) Field of Classification Search
CPC ............ G06F 17/3025; G06K 9/00697; G06K 9/4652; G01J 3/0264; G01J 3/46; G01J 3/526
See application file for complete search history.

(56) References Cited

U.S. PATENT DOCUMENTS

| 4,488,245 A | 12/1984 | Dalke |
| 6,980,219 B2 | 12/2005 | Higgins |

(Continued)

OTHER PUBLICATIONS

"Tiltomo Beta", Tiltomo.com, Sep. 4, 2012, https://web.archive.org/web/20120904074441/http://www.tiltomo.com/? (last visited Oct. 25, 2016).

(Continued)

*Primary Examiner* — Phuoc Tran
(74) *Attorney, Agent, or Firm* — McDermott Will & Emery LLP

(57) ABSTRACT

A method for dynamically displaying results of simultaneous two dimensional image search comprises: maintaining a first database comprising a set of records, each record comprising an image and an associated set of annotations describing the image, receiving an annotation criterion and a color scheme from a user, generating a target color scoring template from the color scheme, conducting a content based search by searching the first database to identify a set of pertinent images satisfying the annotation criterion, and performing the following operations for each image in the set of pertinent images: resizing a given image to a predefined size before generating an image color spectrum histogram for the given image, adding the given image to a pool of acceptable images if the generated image color spectrum histogram matches with the target color scoring template; and dynamically displaying images in the pool of acceptable images to the user.

18 Claims, 14 Drawing Sheets

(51) Int. Cl.
*G06K 9/46* (2006.01)
*G06T 3/40* (2006.01)

(56) References Cited

U.S. PATENT DOCUMENTS

| | | | |
|---|---|---|---|
| 8,326,029 | B1 | 12/2012 | Obrador |
| 8,368,656 | B2 | 2/2013 | Wang et al. |
| 2004/0267740 | A1 | 12/2004 | Liu et al. |
| 2006/0248081 | A1 | 11/2006 | Lamy |
| 2010/0158412 | A1 | 6/2010 | Wang |
| 2011/0085697 | A1* | 4/2011 | Clippard .............. G06K 9/4652 382/100 |
| 2011/0238659 | A1 | 9/2011 | Chittar et al. |
| 2012/0303615 | A1* | 11/2012 | Goswami .......... G06F 17/30247 707/723 |
| 2013/0148883 | A1 | 6/2013 | Lee |
| 2013/0290222 | A1* | 10/2013 | Gordo .............. G06F 17/30247 706/12 |
| 2013/0315477 | A1* | 11/2013 | Murray ............. G06F 17/30247 382/159 |

OTHER PUBLICATIONS

"GazoPaβ similar image search", Gazopa.com, Mar. 20, 2013, https://web.archive.org/web/20130320161929/http://gazopa.com/ (last visited Oct. 25, 2016).

Xu, K., et al., "Sketch2Scene: Sketch-based Co-retrieval and Co-placement of 3D Models", ACM Transactions on Graphics (TOG)—SIGGRAPH 2013 Conference Proceedings vol. 32, Issue 4, Arcitle No. 123, Jul. 2013, pp. 1-12, ACM New York, NY.

"Idée Multicolour Search Lab Alamy Set" Idée Inc., May 28, 2012, https://web.archive.org/web/20120528053834/http://labs.ideeinc.com/multicolour (last visited Oct. 25, 2016).

Bumgarder, J., "flicker Color Fields Experimental Colr Pickr", KrazyDad, 2016, http://krazydad.com/colrpickr/ (last visited Oct. 25, 2016).

Smith, J.R., et al., "VisualSEEk: a fully automated content-based image query system", Multimedia '96 Proceedings of the fourth ACM international conference on Multimedia, 1996, pp. 87-98, ACM New York, NY.

"Retrievr—search by sketch / search by image" retrievr, Apr. 26, 2015, http://web.archive.org/web/20150426092131/http://lages.systemone.at/retrievr/? (last visited Oct. 27, 2016).

Del Bimbo, A., et al., "Visual Image Retrieval by Elastic Matching of User Sketches", IEEE Transactions on Pattern Analysis and Machine Intelligence, vol. 19, No. 2, Feb. 1997, pp. 121-132.

Flickner, M., et al, "Query by Image and Video Content: The QBIC System", Computer, vol. 28, Issue 9, Sep. 1995, pp. 23-32, IEEE Computer Society Press Los Alamitos, CA.

* cited by examiner

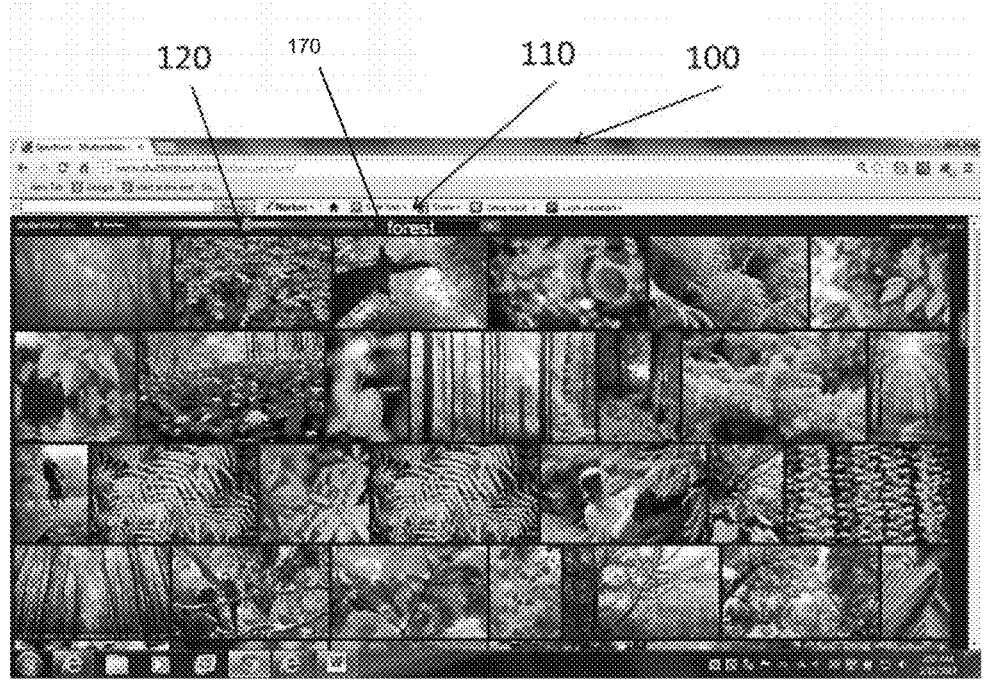

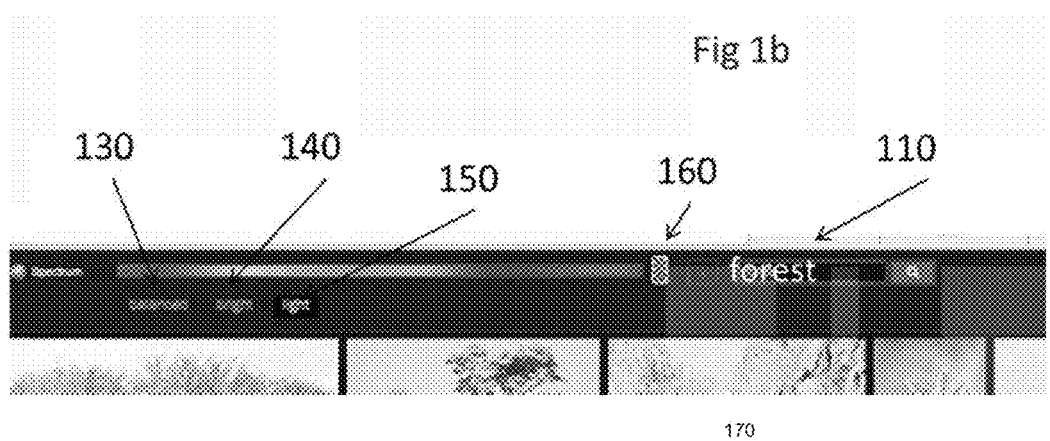

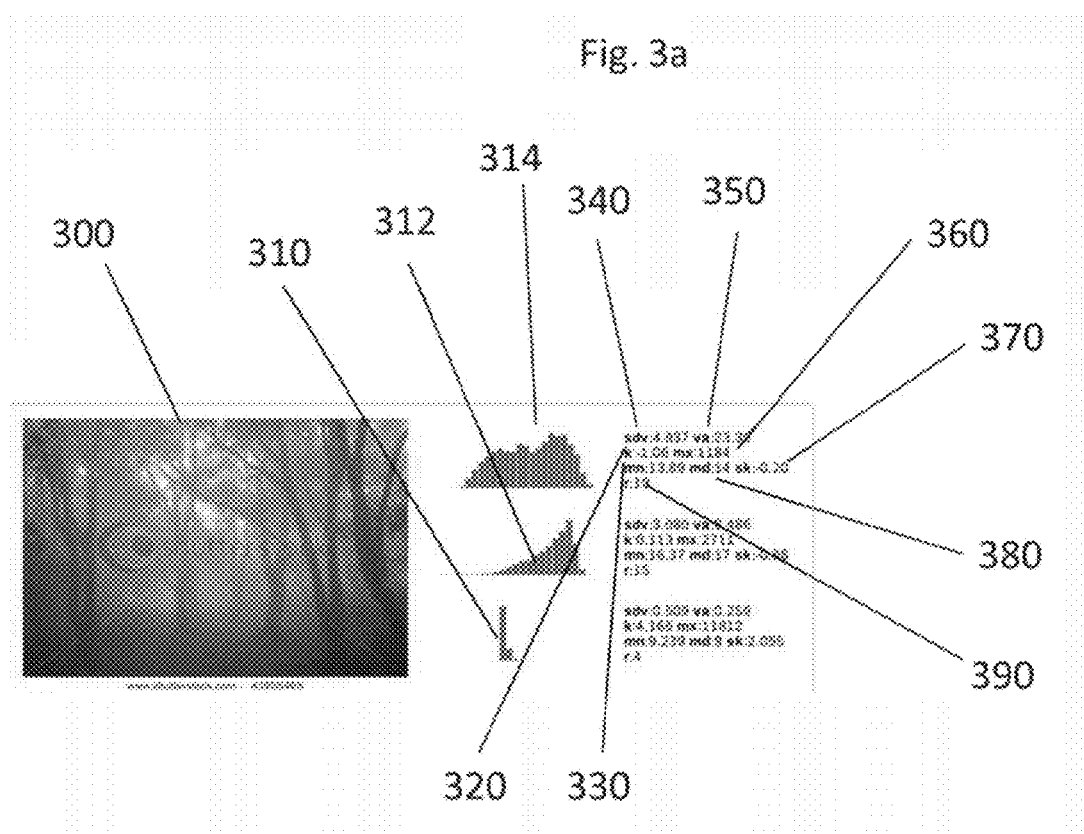

CONTENT BASED SYSTEMS AND METHODS FOR CONDUCTING SPECTRUM COLOR BASED IMAGE SEARCH

CROSS-REFERENCE TO RELATED APPLICATIONS

The present application claims the benefit of priority under 35 U.S.C. §120 as a continuation from U.S. patent application Ser. No. 14/205,429 filed on Mar. 12, 2014, which claims the benefit of priority under 35 U.S.C. §119 from U.S. Provisional Application No. 61/782,522 filed on Mar. 14, 2013, the disclosures of which are hereby incorporated by reference in its entirety for all purposes.

BACKGROUND

1. Field of Disclosure

The present disclosure generally relates to the field of content image searching and specifically the field of image sorting by color.

2. Brief Description of Related Art

A primary challenge in the design of a content-based image retrieval system involves identifying meaningful color attributes that can be extracted from the content and used to rank the content in accordance with the degree of relevance to a particular search term request. In statistics, a histogram is a graphical representation showing a visual impression of the distribution of data. It is an estimate of the probability distribution of a continuous variable. A histogram consists of tabular frequencies, shown as adjacent rectangles, erected over discrete intervals (bins or buckets), with an area equal to the frequency of the observations in the interval. The height of a rectangle is also equal to the frequency density of the interval, i.e., the frequency divided by the width of the interval. The total area of the histogram is equal to the number of data.

A histogram may also be normalized displaying relative frequencies thereby displaying the proportion of cases that fall into each of several categories, with the total area equaling or summing to one. The categories are usually specified as consecutive, non-overlapping intervals of a variable. The categories or intervals must be adjacent, and often are chosen to be of the same size. The rectangles of a histogram are drawn so that they touch each other to indicate that the original variable is continuous.

Generally, the histogram provides a compact summarization of the distribution of data in an image. The color histogram of an image is relatively invariant with translation and rotation about the viewing axis, and varies only slowly with the angle of view. By comparing histograms signatures of two images and matching the color content of one image with the other, the color histogram can be particularly well suited for the problem of recognizing an object of unknown position and rotation within a scene.

The first deficiency of image histograms is that while the representation of an object in the image histogram is dependent upon the color of an object being studied the image histograms ignore the object's shape and texture. Due to this apparent drawback, the color histograms can potentially be identical for two images with different object content but have identical color information. Put another way, without spatial or shape information, similar objects of different color may be indistinguishable based solely on the color histogram comparisons. Consequently, there is no way to distinguish a green leaf from a green box. A second deficiency of image histograms is that image histogram-based algorithms do not distinguish between "generic" and "specific" objects. For example, a representation of a green leaf is not useful when given an otherwise identical except for another color red leaf.

A third deficiency of image histograms is that they have a high sensitivity to noisy interference such as lighting intensity changes and quantization errors. Generally, translation of a red-green-blue, "RGB," image into the illumination invariant red-green chromaticity, i.e., RGchromaticity space normally allows the histogram to operate well in varying light levels. One overriding problem in image searching is that there may be a misinterpretation between words (i.e., the way one searches) and images (i.e., for what is searching, in a particular instance). There is a need to resolve these issues by adding a text tag to the image, thereby adding an additional dimension for comparative and descriptive purposes.

BRIEF SUMMARY

By way of introduction only, the present embodiments provide computer implemented systems and methods for dynamically displaying results of simultaneous two dimensional image searches initiated via user input is disclosed. The system is configured to perform the following operations: maintain a first database comprising a set of records, each record comprising an image and an associated set of annotations describing the image, receive the user input comprising an annotation criterion and a color scheme from a user, generate a target color scoring template from the color scheme, and conduct a content based search by searching the first database to identify a set of images satisfying the annotation criterion, and perform the following operations for each image in the set of images: resize a given image to a predefined size before generating an image color spectrum histogram for the given image, and conduct a color based search by adding the given image to a pool of acceptable images if the generated image color spectrum histogram matches with the target color scoring template, and dynamically display images in the pool of acceptable images to the user.

The foregoing discussion of the preferred embodiments has been provided only by way of introduction. Nothing in this section should be taken as a limitation of the claims, which define the scope of the invention. Other features and advantages of the invention will become apparent from the following description, including the drawings and the claims.

BRIEF DESCRIPTION OF THE DRAWINGS

FIG. 1a depicts a screenshot of an interface 100 displaying the results of simultaneous two dimensional image searches. FIG. 1b depicts the details of the color slider bar indicator 120 from FIG. 1a.

FIG. 3a indicates a detailed description of an image search result histogram.

DETAILED DESCRIPTION OF THE PREFERRED EMBODIMENTS

Figure 2A:
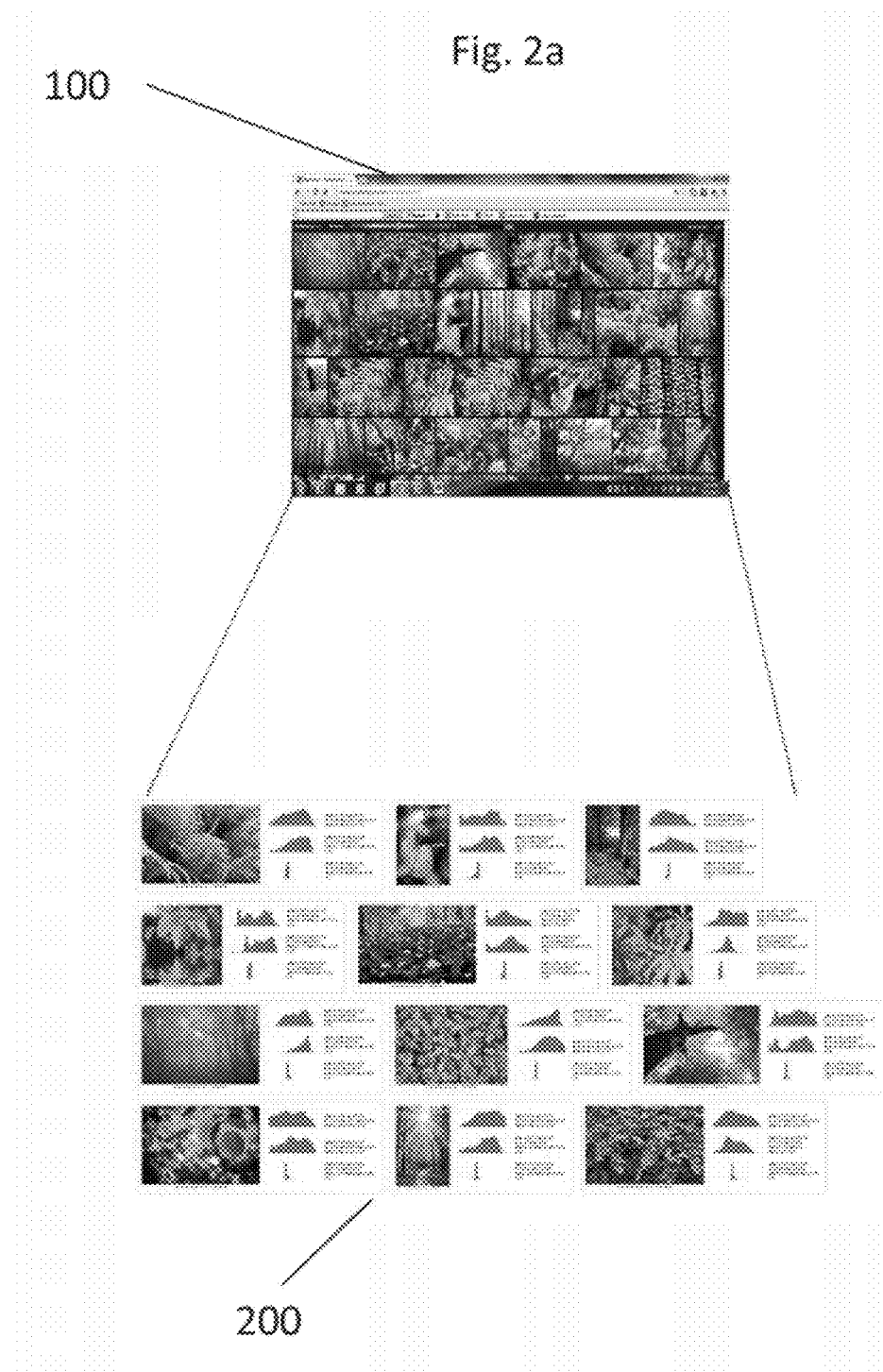
FIG. 2a illustrates a screenshot of the image search results and an explosion of the individual image results.

The present disclosure describes computer implemented systems and methods for dynamically displaying results of simultaneous two dimensional image searches initiated via a user input. The system is configured to perform the following operations: maintain a first database comprising a set of records, each record comprising an image and an associated set of annotations describing the image, receive the user input comprising an annotation criterion and a color scheme from a user, generate a target color scoring template from the color scheme, and conduct a content based search by searching the first database to identify a set of images satisfying the annotation criterion, and perform the following operations for each image in the set of images: resize a given image to a predefined size before generating an image color spectrum histogram for the given image, and conduct a color based search by adding the given image to a pool of acceptable images if the generated image color spectrum histogram matches with the target color scoring template, and dynamically display images in the pool of acceptable images to the user.

This invention adds to field of color science by providing (1) a two dimensional search query slider user interface for instantaneous and interactive color search results feedback, (2) a quantitative measure or value for aesthetic appropriateness, and (3) a novel use of color image histograms which in turn offers significant commercial benefits to what are considered deficiencies of color image histograms. The technique used by the disclosed method involves a special case of histograms called image histogram, including color as well as black and white or grayscale image histograms. An image histogram is a graphical representation of the tonal distribution in a digital image. It plots the number of pixels for each tonal value. By calculating the histogram for a specific image, the image's entire tonal distribution is available for comparative purposes. For example, photographers use image histogram generation features on digital cameras as an aid to show the distribution of tones captured, and to ascertain whether or not image detail has been lost to "blown-out highlights" or "blacked-out shadows."

This invention proposes an improvement to image search and classification technologies by capitalizing on what could be considered four deficiencies of image histograms use, namely: (1) histograms ignore objects' shape and color, (2) histograms are unable to distinguish between general and specific objects, (3) histograms are overly sensitive to noisy lighting and quantization interference, and (4) histograms typically produce a high degree of variability in black and white and gray scale histograms.

In the preferred embodiment, the invention features a method in accordance with which a respective model of predominant image color and color shadings (hues) are determined for each image in a set of images. For each of the images, a respective color spectrum histogram is extracted from the image; each of the LCH channels is labeled with a set of distribution measures and text description metadata, i.e., keyword. An image query is generated from a target color scoring template. For each of the images, a respective histogram is generated and calculated from the image query and the respective color model and text query. The invention also features apparatus and a machine readable medium storing machine readable instructions causing a machine to implement the method described above.

Other embodiments of the invention include uses where users search for the most beautiful image that will fit in with a certain ad campaign, presentation, or project, and fit in with a certain color scheme. Users type in a search term, and start sliding that color bar back and forth to find the right image in the desired full spectrum of color available for search, in, as an option, a strictly black and white or greyscale as well. Users can also filter searches by hue, with options for "bright" and "light" photos. The idea isn't just to make photos more easily searchable by adding a new tool to the platform that helps users find inspiration. For example, a user may never imagine a purple forest or a golden ocean, but this invention changes all that, and actually helps users imagine more creative photos because of it.

Three examples are described to illustrate functionalities of the disclosed invention. A first example is that of a user intending to conduct a search for a geographic location, Shanghai, enters annotation criterion "Shanghai" and the red color scheme. Notably, this search may yield different results based on the user selected position of the color slider. In the above mentioned example, since the user selected the red color scheme, the method may display bright red images such as the images of the red paper lanterns, red dragon paper umbrella, Bund tourist tunnel, Shanghai lantern festival and the like. Alternatively, if the user enters annotation criterion "Shanghai" and the green color scheme, the method may display green images such as Chinese gardens, green puppet collection, green vegetables and the like. Similarly, if the user enters annotation criterion "Shanghai" and the blue color scheme, the method may display blue colored images such as architecture of the city, Shanghai skyline, overpasses and the like.

In a second example, a user enters annotation criterion "Power" and selects the red color scheme. The method may display red colored images such as images of fire, smoke, wind power turbines at dusk, and the like. If the user selects the green color scheme, the method may display images related to green energy, nature's power, and the like. Likewise, if the user selects the blue color scheme, the method may display images related to electricity, lightning, engines, city grids, and the like. In a third example, a user enters annotation criterion "forest" and the green color scheme. The method may display green colored images such as images of traditional forest photography, green leaves, green vegetables and the like. Similarly, if the user selects red color scheme, the method may display images related to the red forest berries, red fruits, red foliage and the like.

FIG. 1a is a screenshot of an interface 100 displaying the results of simultaneous two dimensional image searches. The disclosed method is configured to maintain a first database comprising a set of records, each record comprising an image and an associated set of annotations describing the image. A user may conduct a search by providing a text string or an annotation criterion and a designated companion color or a color scheme. The disclosed method may generate a target color scoring template from the color scheme. Then the method may conduct a content based search by searching the first database to identify a set of pertinent images satisfying the annotation criterion. Notably, the set of pertinent images comprise images that satisfy the annotation criteria provided by the user. Thereafter, the method may perform the following operations for each image in the set of pertinent images: resize a given image to a predefined size before generating an image color spectrum histogram for the given image, and conduct a color based search by adding the given image to a pool of acceptable images if the generated image color spectrum histogram matches with the target color scoring template. Finally, the method may dynamically display images in the pool of acceptable images to the user.

In other words, the disclosed method may perform a twofold query, the first query is performed to identify a set of pertinent images and the second query is performed to identify a pool of acceptable images. Accordingly, if the user has entered the annotation criteria "forest" and the color scheme is green, then, in the first query, regardless of the color of the images, all of images in the first database that have an associated annotation "forest" are selected in the set of pertinent images. In the second query, image color spectrum histogram is generated for each image in the set of pertinent images. If the generated image color spectrum histogram matches with a target color scoring template, the given image from the set of pertinent images is added to a pool of acceptable images. In the aforementioned example, only green colored images are added to a pool of acceptable images after performing the second query.

The search results displayed on interface 100 indicate that a search has been conducted to locate a set of images that are associated with the annotation criterion "forest" and a designated color scheme. A user may conduct an image search from a remote location using a computing device. The user may provide the annotation criterion via an input area 110. The input area 110 may be configured to accept an alphanumeric input from the user. Likewise, the user may designate the color scheme using a color slider bar indicator 120 for choosing the companion color of the searched images. Optionally, the user may select a B/W selector option 160, when this option is selected, the disclosed method may only display black and white images that represent the annotation criterion forest.

Thus, the disclosed method may conduct a search for images that represent the user designated annotation criteria and color scheme. After conducting the image search, the disclosed method may display images associated with the searched annotation criteria and color scheme on the interface 100. The interface 100, displays image search results for the annotation criterion "forest," and the color scheme "green." Notably, since the interface 100 is shown in black and white colors the color spectrum on the color slider bar indicator 120 and color green indicated on the color slider bar indicator 120 is not visible in FIG. 1.

The details of the color slider bar indicator 120 from FIG. 1a are depicted in FIG. 1b. Three options are provided on an interface 160 displaying image search results, when a user conducts a search by providing an annotation criteria "forest" in the search box 110 and a B/W selector option 170 for designating a color scheme or a companion color. The first option is balanced radiation selection option 130, which when selected, provides a balanced light on the interface 160. A bright radiation selection option 140 provides a bright light on the interface 160, while a light radiation selection option 150 provides lighter radiation on the interface 160.

FIG. 2a illustrates a screenshot of the image search results and an explosion of the individual image search results. A first interface 100 is an interface displaying search results for a query run by a user searching for a specific image. An explosion of the first interface 100 displaying the image search results is shown via a second interface 200, which is a screen shot displaying the individual image search results with the histograms, statistical calculations, and graphs. The various components of the interface 200 are described in detail in conjunction with FIG. 2b.

Figure 2B:
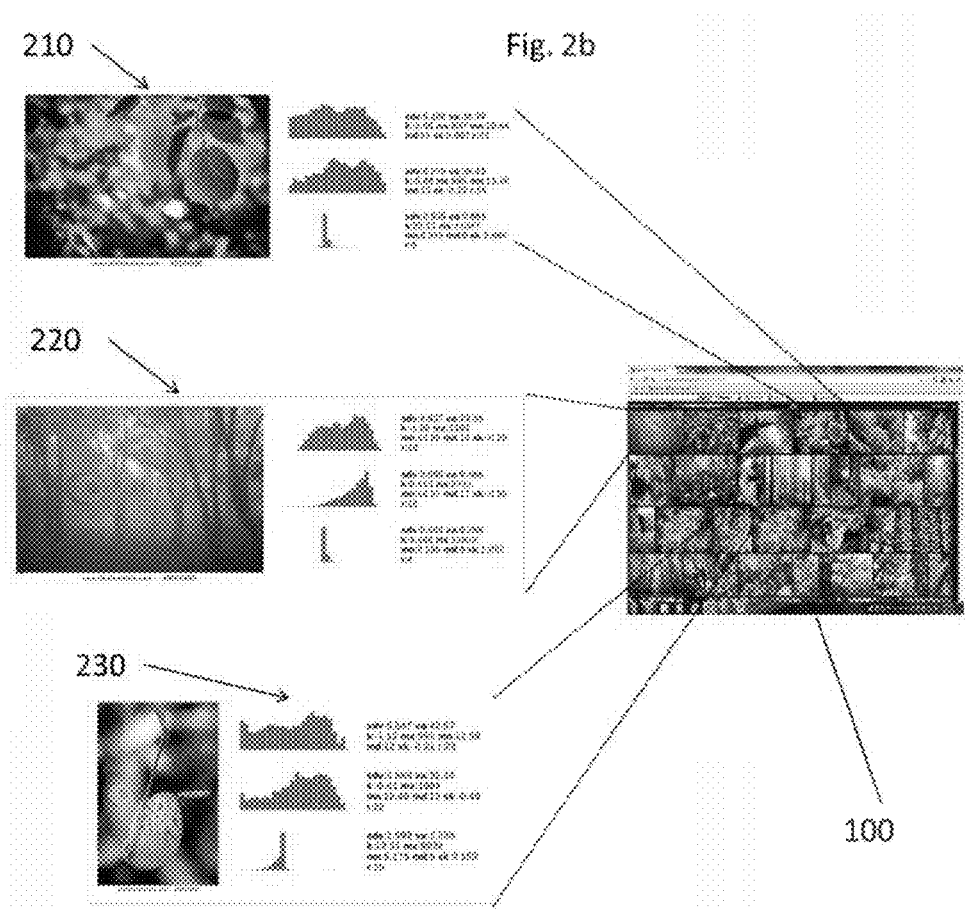
FIG. 2b depicts an interface illustrating a detailed explosion of three image search results.

FIG. 2b is a detailed explosion of three image search results displayed on the interface 100. A first image histogram 210, a second image histogram 220, and a third image histogram 230 are the three image histograms displayed in FIG. 2b. The first image histogram 210, the second image histogram 220, and the third image histogram 230 are the explosions of three individual displays of histograms for three images in the search results displayed on the interface 100. These image histograms are explained in further detail in conjunction with FIG. 3a-3c.

FIG. 3a indicates a detailed description of an image search result histogram. FIG. 3 displays an image 300 that was located in the image search results. The histogram of the blue hue (H) color channel is shown by graph 310. Graph 312 shows the histogram of the green chroma (C) color channel and graph 314 shows the result of the red lightness (L) color channel. Part 320 denoted by "k," represents the statistical kurtosis of the color channel, and part 330 denoted by "m" represents the statistical mean of the color channel. Likewise, part 340 denoted by "sdv" represents the statistical standard deviation for the corresponding color channel, and part 350 denoted by "va" represents the statistical variance for the corresponding color channel.

Further, part 360 represents histogram max value, which gives the value of the height of the tallest bar in the histogram. That value, referred to as "hist_24_max," in the sorting function code, which may be used determine the degree of distribution, i.e., the shorter the tallest bar, the more even the distribution, and if the tallest bar is relatively very tall, there must be a lot of concentration in that one color channel bar. Conversely, if the tallest bar is very short, it can be assumed that there may not be any particular concentration of that color channel. Part 370 denoted by "sk" represents the statistical 'skewness' of the color channel, part 380 denoted by "md," represents the statistical median of the color channel, and part 390 denoted by "r" represents the statistical range of the color channel.

Figure 3B:
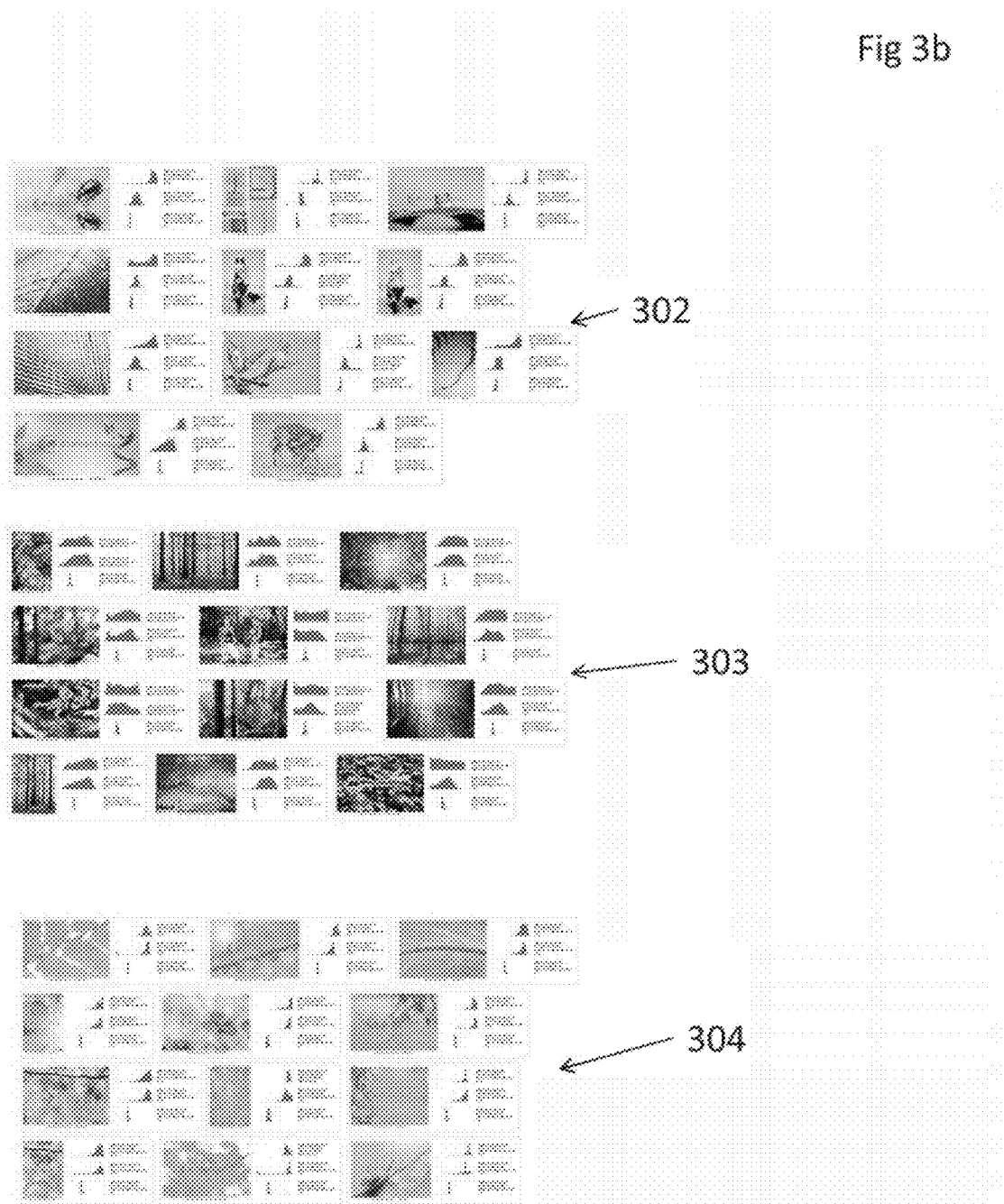
FIG. 3b is a detailed description of three image search result histograms showing light, balanced, bright color search options.

FIG. 3b is a detailed description of three image search result histograms showing light, balanced, bright color search options. FIG. 3b is a detailed description of three image search result histograms showing light part 302, balanced part 303, and bright part 304 of color search options.

Figure 3C:
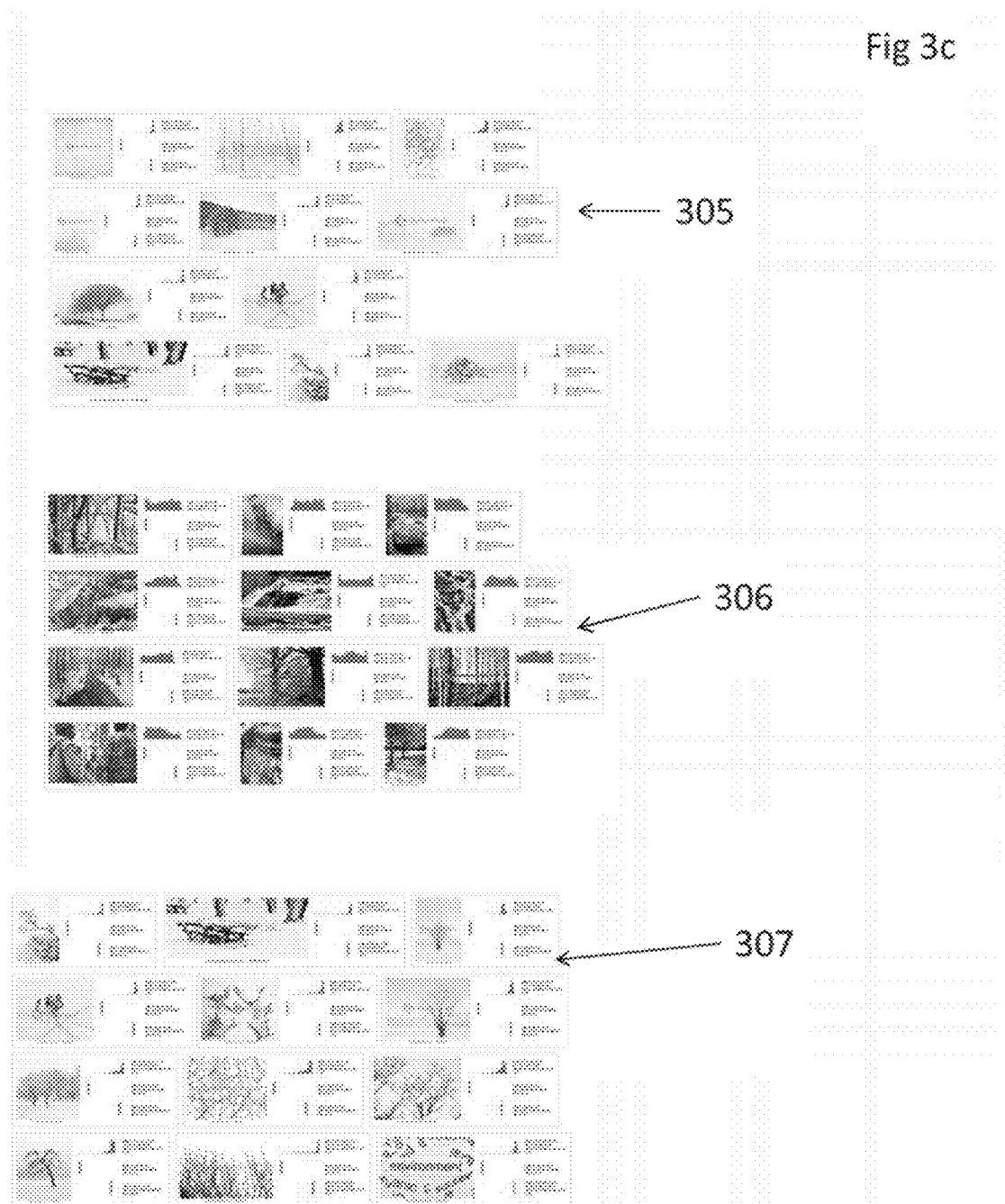
FIG. 3c is a detailed description of three image search result histograms showing light, balanced, bright black and white search options.

FIG. 3c is a detailed description of three image search result histograms showing light, balanced, bright black and white search options. FIG. 3c is a detailed description of three image search result histograms showing light part 305, balanced part 306, and bright part 307 of black and white search options.

Figure 4:
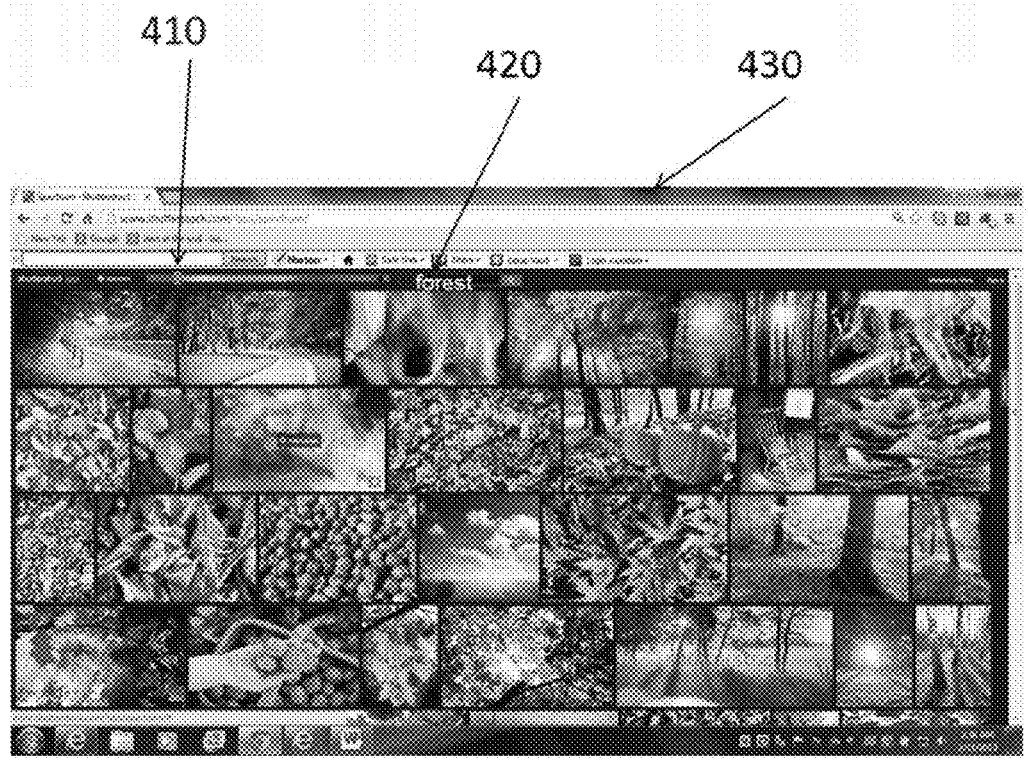
FIG. 4 illustrates a screenshot of image search results when a user conducts a search for the annotation criteria "forest"

FIG. 4 represents an illustration of the screenshot of an interface 430 displaying image search results when a user conducts a search by providing the annotation criteria "forest" in an input area 420 and the color scheme indicated by a color slider bar indicator 410. As discussed above, a given user search query may be a twofold query, comprising two components, an annotation criteria component and a color scheme component. Remarkably, even though the two queries shown in FIG. 1 and FIG. 4 have identical annotation criteria component, because the color scheme component is different in the two queries, the images displayed on the interface 100 are different from the images displayed on the interface 430.

A system for dynamically displaying results of simultaneous two dimensional image search initiated via a user input is disclosed. The system is configured to perform the following operations: maintain a first database comprising a set of records, each record comprising an image and an associated set of annotations describing the image, receive the user input comprising an annotation criterion and a color scheme from a user, generate a target color scoring template from the color scheme, and conduct a content based search by searching the first database to identify a set of images satisfying the annotation criterion, and perform the following operations for each image in the set of images: resize a given image to a predefined size before generating an image color spectrum histogram for the given image, and conduct a color based search by adding the given image to a pool of acceptable images if the generated image color spectrum histogram matches with the target color scoring template, and dynamically display images in the pool of acceptable images to the user.

Figure 5:
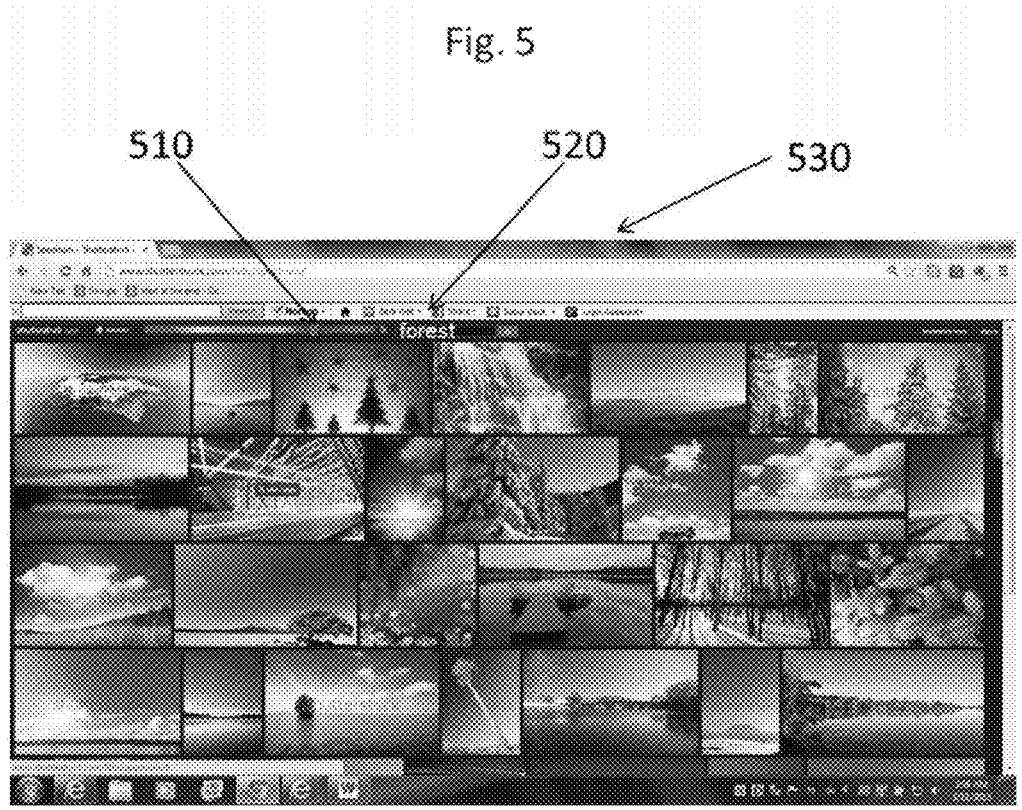
FIG. 5 represents a screenshot of image search results when a user selects a new color choice via a color slider bar indicator.

FIG. 5 represents another example of a screenshot of the interface 530 resulting from yet another color choice represented by a color slider bar indicator 530. The screenshot results when a user conducts a search by providing the annotation criteria "forest" in an input area 520 and a new color scheme associated with a color slider bar indicator 510. As discussed above, even though queries shown in FIG. 1, FIG. 4 and FIG. 5 have identical annotation criteria, because a different color component is selected via a color scheme choice, different images are displayed on the interface 100, 430, and 530. Accordingly, the search query results of the disclosed method are a function of an annotation criteria and a color scheme choice selected by a user.

Figure 6:
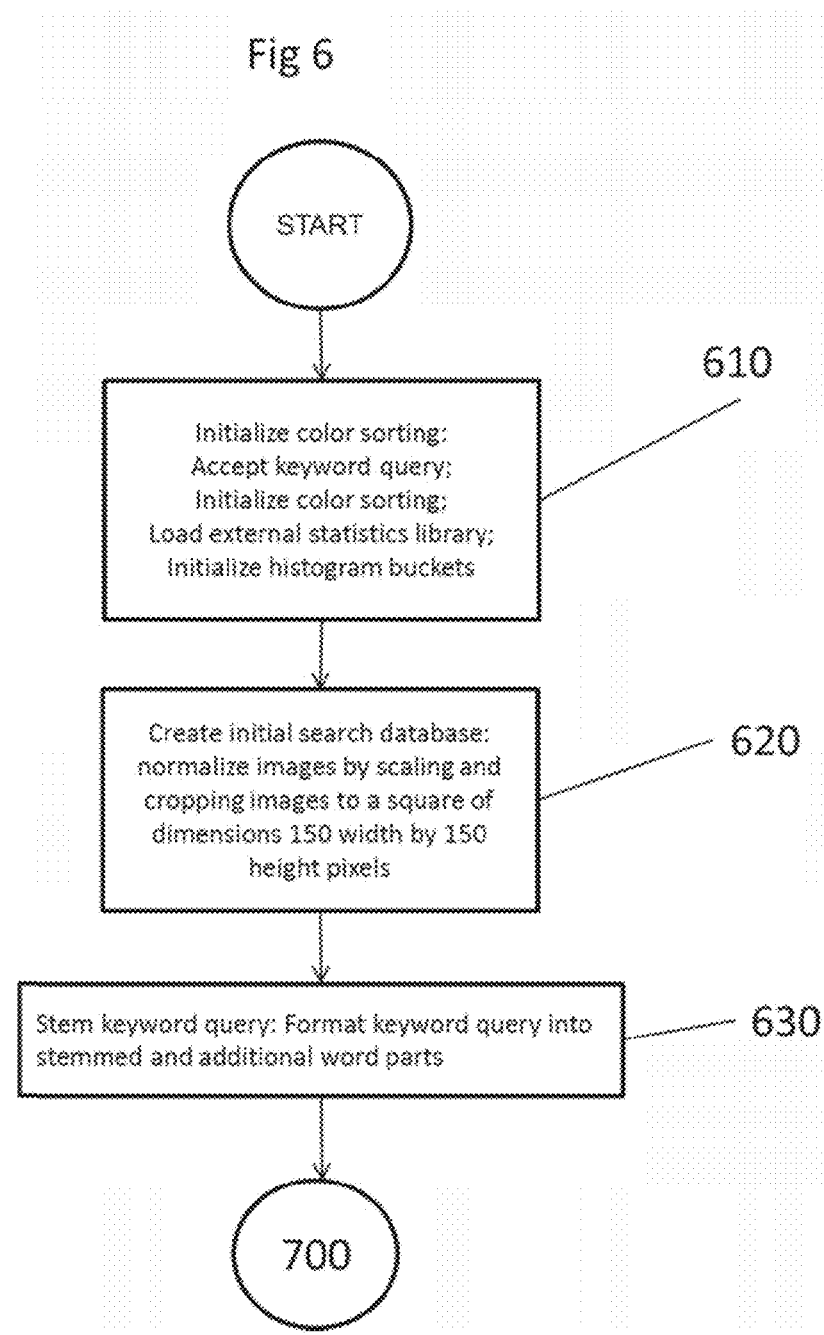
FIG. 6 illustrates a flow chart of various image search initialization operations performed by the preferred embodiment of the disclosed method.

A flow chart of various image search initialization operations performed by the disclosed method is illustrated in FIG. 6. The method may initialize color sorting, accept a keyword query from a user, initialize color sorting, load an external statistics library and initialize histogram buckets at block 610. Further, at block 620, the method may create an initial search database by normalizing images, i.e., scaling and cropping image to remove any image identifiers or metadata, to a square that is 150 pixels wide and 150 pixels height. Such that when the image search results are displayed to the user, regardless of the original sizes of the images, all images have the same number of pixels (i.e. have identical dimensions).

In one embodiment of the disclosed invention, images may be sorted at the query time, but then those results may be cached so that images need not be sorted again when subsequently another user makes an identical query. Another embodiment may perform pre-caching, where the method may work from a list of most popular search terms, and pre-compute and cache those search result sets proactively, even before users conducts a search. Therefore, in most cases, a user will hit a cache, regardless of whether the cache was pre-computed or whether the cache was populated from an identical query previously submitted by another user. But in some cases, where a user searches for a relatively obscure term, the method may not find any hits in the cache and sort the images dynamically in the context of that request.

To accomplish this goal, larger images maybe scaled down and smaller images maybe scaled up. For example, the width of a panoramic image may be scaled down to 150 pixels, and the width of a smaller image may be scaled up to 150 pixels. This aids in creating an aesthetically pleasing image layout on the user interface. At block 630, the method may stem a keyword query entered by the user. Stemming is the process for reducing inflected or sometimes derived words to their stem, base or root form. Further, the method may format keyword query into stemmed and additional word parts. Then the process may exit at block 700.

Figure 7:
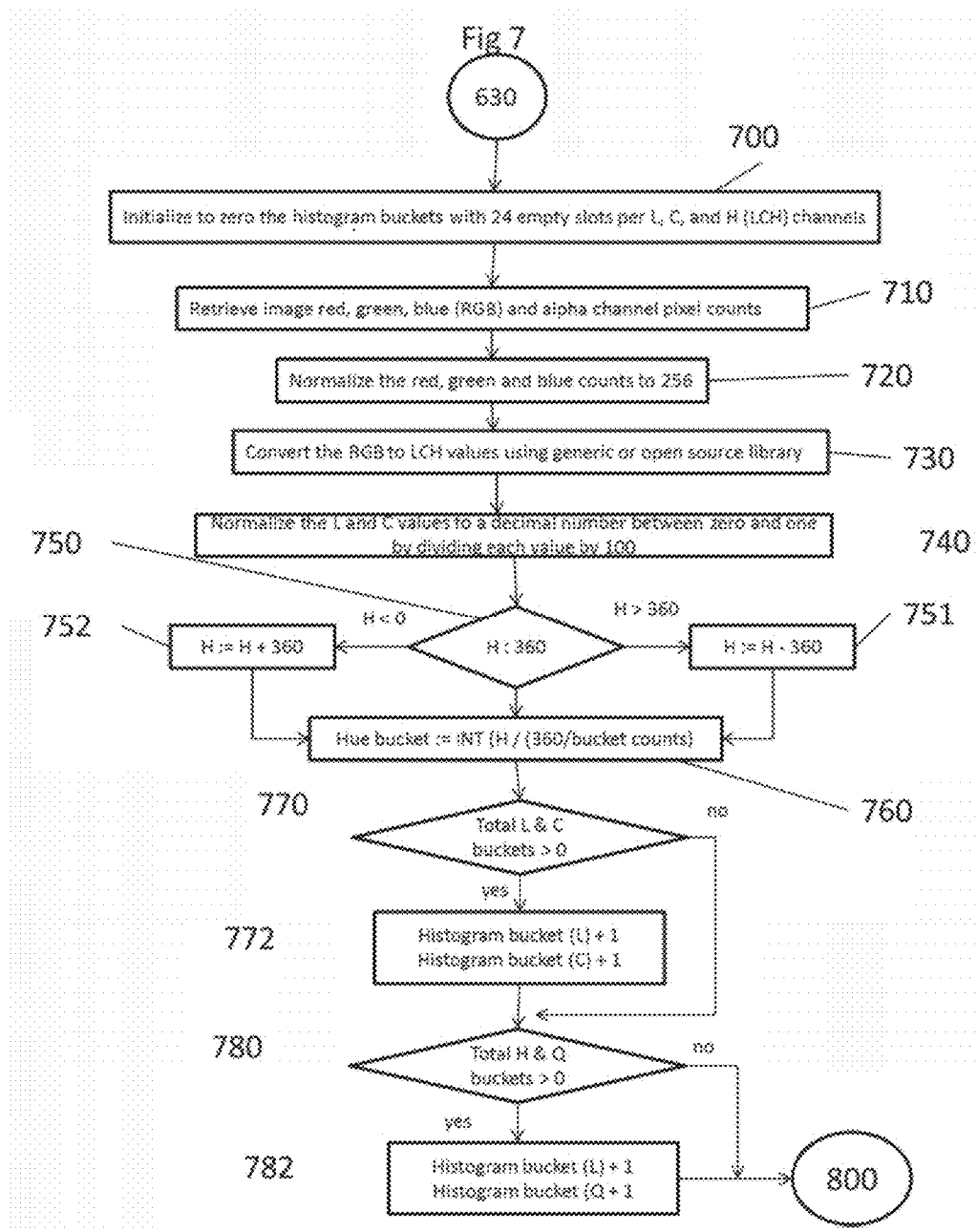
FIG. 7 depicts a flow chart of various operations performed while creating a histogram for each image.

FIG. 7 depicts a flow chart of various operations performed by the method while creating a histogram for each image. At block 700, the method may initialize the histogram buckets to zero with 24 empty slots per L. C, and H (LCH) channels. At block 710, the method may retrieve red, green, blue (RGB) and alpha channel pixel counts of a given image. The red, green and blue counts are normalized to 256 at block 720. The method may convert the RGB to LCH values using generic or open source library at block 730. The L and C values are normalized at block 740 to a decimal number between zero and one by dividing each value by 100. At blocks 750, 751 and 752 the method may normalize the H value to a value between zero and 360 by decrementing H by 360 if H is greater than 360 and incrementing H by 360 if H is less than zero.

Image histograms may typically have a high sensitivity to noisy interference such as lighting intensity changes and quantization errors. The disclosed method resolves this issue by providing an improvement of current technologies by incorporating both red-green-blue, "RGB" and luminance, chromaticity, and hue angle, "LCH," image color descriptors for image search comparisons. Another problem associated with image histograms is that color histogram equalization methods do not yield a uniform histogram in gray scale. After converting a color histogram equalized image into gray scale, the contrast of the converted image is worse than that of a single dimension, i.e., 1 D, gray scale histogram equalized image. The disclosed method proposes a novel three dimensional, i.e., 3D, color histogram equalization method that produces uniform distribution in gray scale histogram by defining a new density function in 3D color space when converting RGB data to LCH color space as contrasted with techniques that use native RGB data.'

At block 760, the value of the hue bucket is calculated by taking the integer portion of the division of H by the fraction of three hundred sixty over the bucket counts. The histogram bucket counts are incremented by 1 at block 772 if block 770 indicates that the total counts are greater than zero for each of the L, and C buckets. At block 782, the H and optional Q buckets value is incremented if the block 780 indicates that the total H and Q buckets values are not greater than zero. On the other hand, if the block 780 indicates that the total H and Q buckets values are less than zero, then the process moves to block 800, which is discussed in detail in conjunction with FIG. 8. In the present embodiment, the Q bucket may be an experimental place holder for the future use. The Q bucket denotes a measure of how chroma and hue interact, and can be used for refining results, e.g. adding or subtracting saturation. After performing step 782, the process exits at block 800 which is discussed in detail in conjunction with FIG. 8.

Figure 8:
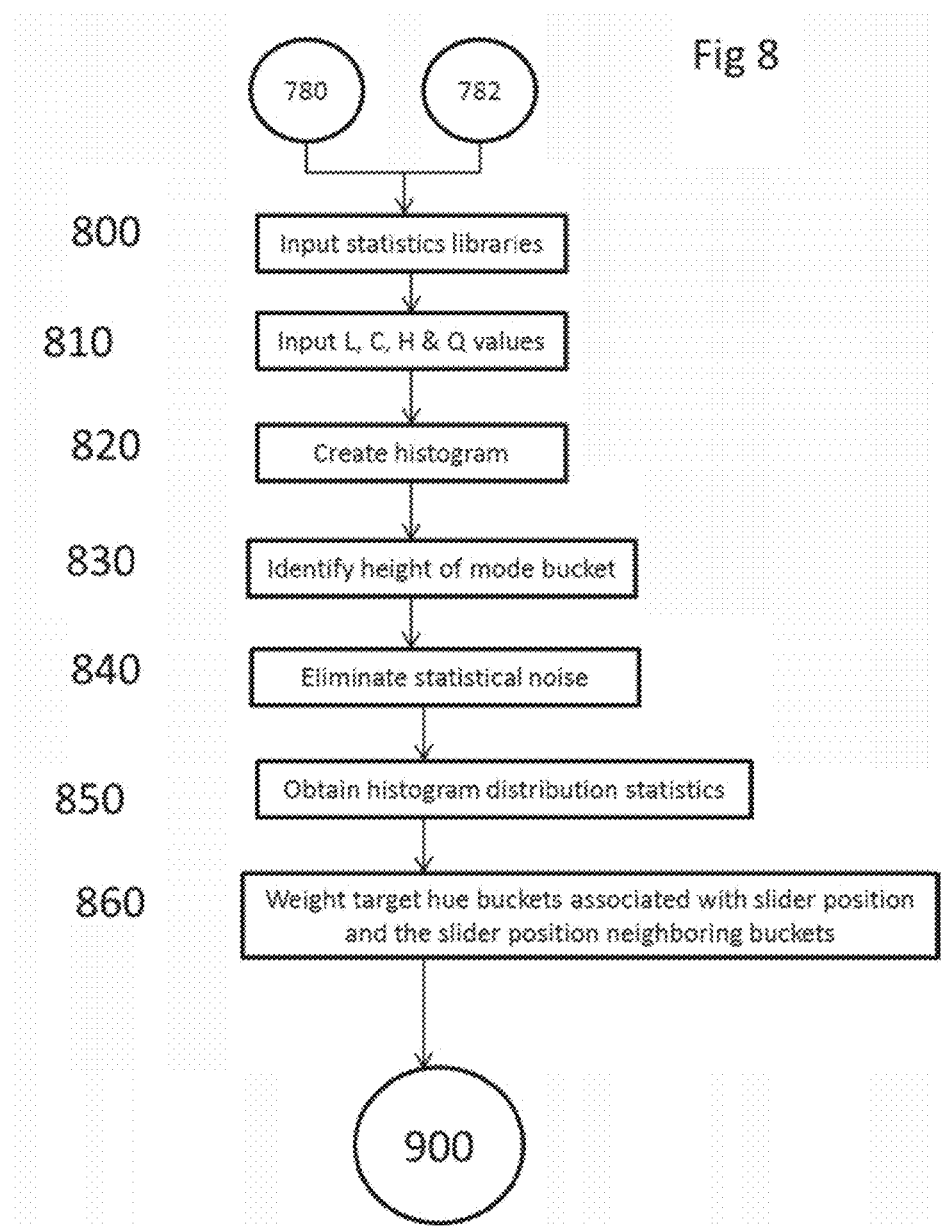
FIG. 8 shows a statistical calculation process for creating the histogram for each image.

FIG. 8 denotes a statistical calculation process for creating the histogram for each image. As discussed above, the process is initiated from blocks 780 or 782. At block 800, the method may input an external generic or open source statistics library. Then the process may input the L, C, H and Q values at block 810. Using the statistics libraries and the L, C, H and Q values, the process may create histogram at block 820. Next, the process may identify the height of the statistical mode bucket, i.e., the bucket with highest count at block 830. This is when "hist_max" or "mx" value may be configured, which is exactly the maximum height across the histogram. The "histogram_max" value may indicate the height of the tallest bar. The notion here is that the shorter the tallest bar, the more even the distribution, since there's a set, constant number of pixels being mapped across the histogram buckets. Said another way, if the tallest bar is very tall, there must be a lot of concentration in that one bar. Conversely, if the tallest bar is very short, there must not be any particular concentration anywhere.

Further, the process may eliminate statistical noise by using high-pass filters such as dividing values by thirty-two and rounding to obtain an integer value at block 840. The process may also obtain several histogram distribution statistical parameters at block 850 using generic or open source statistical library. The statistical parameters may include but are not limited to range, variance, standard deviation, skewness, kurtosis, mean, median, mode, and the like. Block 860 comprises weighing of the target hue buckets associated with the color slider position to sort images: weight the target hue bucket associated with the slider position by a weight of 10; weight the neighbor hue on either side of the target hue by a weight of 5; weight the neighbor hue on either side of the hue of weight 5, by 3; weight the neighbor hue on either side of the hue of weight 3 by 2; weight the neighbor hue on either side of the previous hue by 1. After performing the above mentioned operations at block 860, the process exits at block 900.

Figure 9:
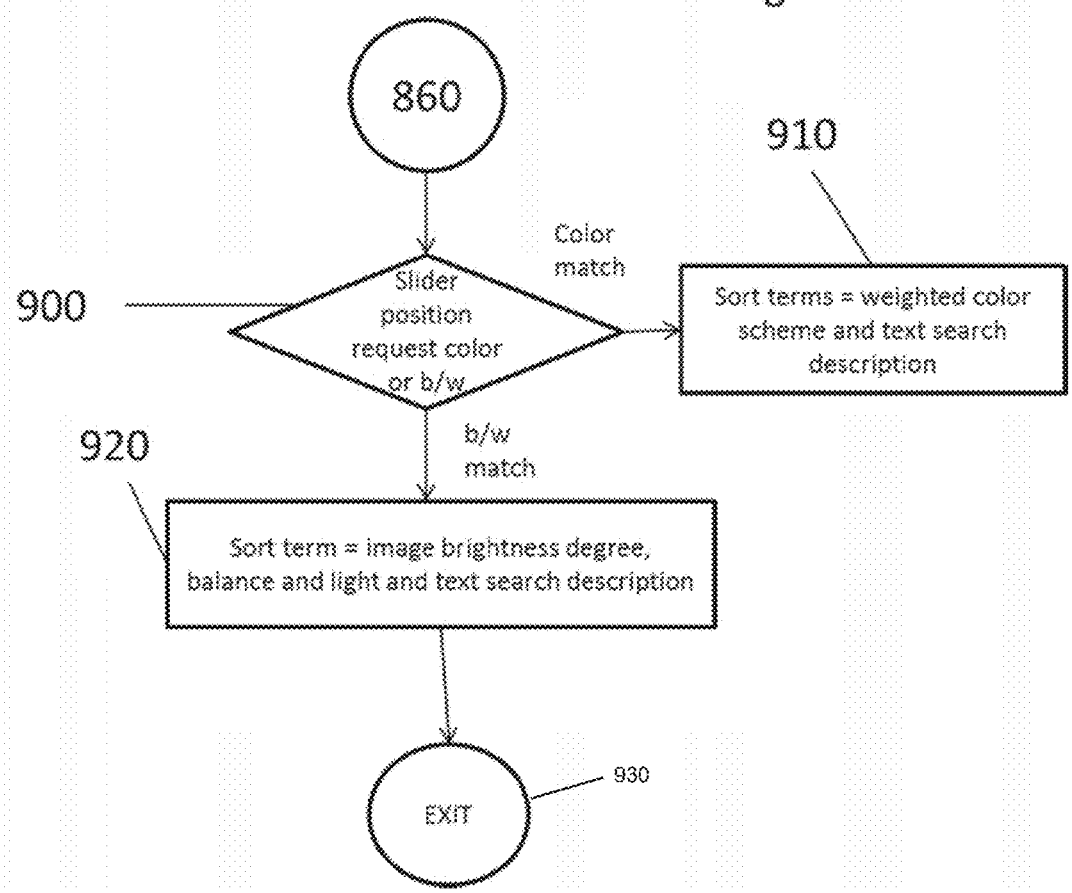
FIG. 9 indicates a process of sorting of the color and black and white images.

FIG. 9 indicates a process of sorting of the color and black and white images. The process begins at block 860. At block 900 the process ascertains whether the slider position requests a color match or a black and white match. If the request slider position requests a color match, then the process sorts the images based on matches with the resultant weighted schemes from 5 by finding the product of the weighted hue match and text search description at block 910. However, if the request slider position requests a black and white match then at block 920 the process may use degree of image brightness, balance and light as the sort terms for the images:

1. Brightness is calculated as the product of (1+lightness C median)*(1+lightness L hist_max)*(1+lightness C max) *(1+DIST(2, lightness L median, 95))*(1+lightness L STD) *(1+DIST(2, lightness L min, 0));

2. Balanced is calculated as the product of (1+chroma C medium)*(1+lightness L hist_max)*(1+chroma C max);

3. Light is calculated as the product of (1 lightness C median)*(1+lightness C max)*(1+DIST(2, lightness L median, 95))*(1-3-DIST(2, lightness L min, 95))

After performing these operations the process exits at block 930.

Figure 10:
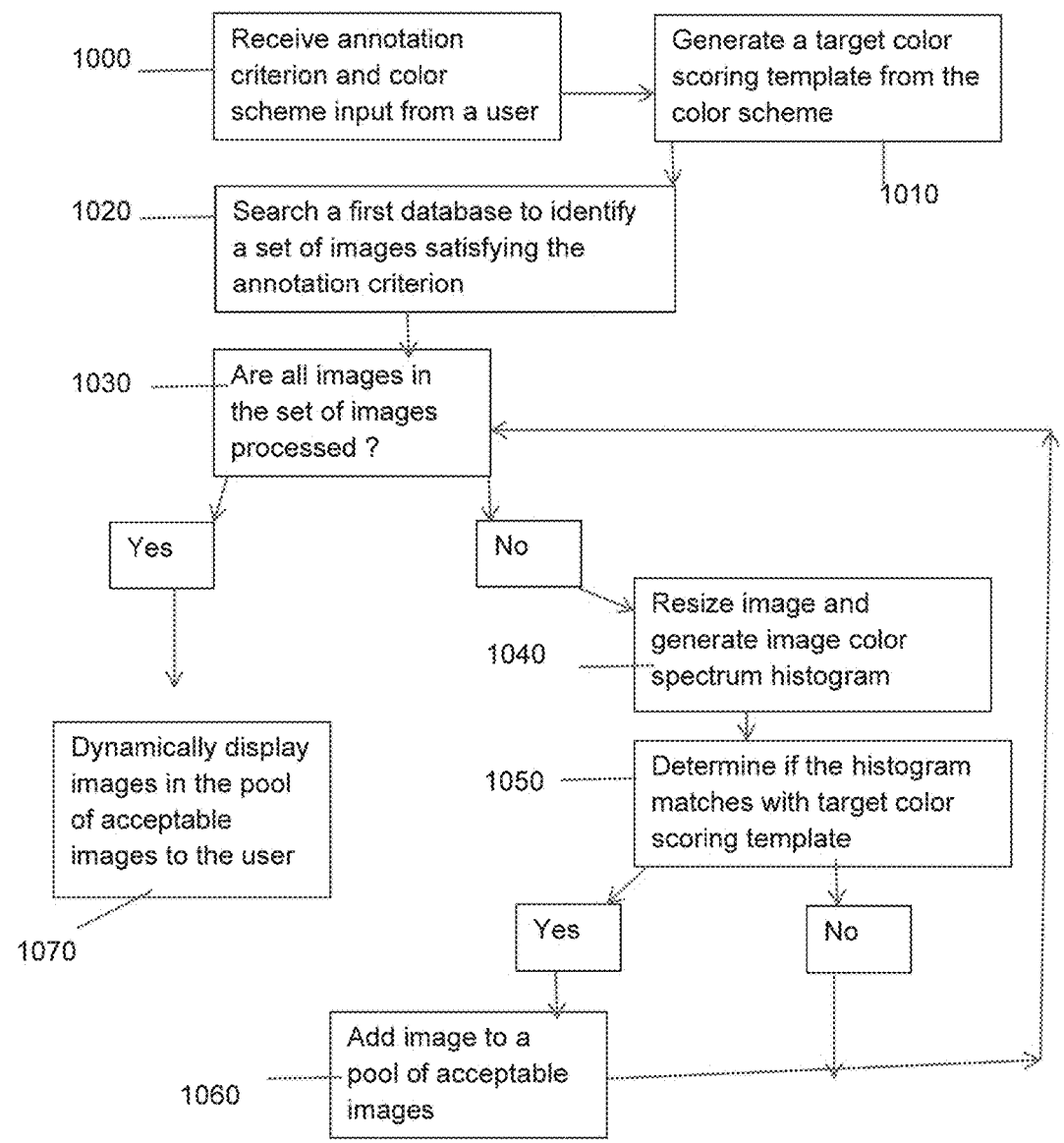
FIG. 10 depicts a flow chart of image selection process according to the preferred embodiment of the disclosed invention.

FIG. 10 depicts a flow chart of an image selection process according to the preferred embodiment of the disclosed invention. For ease of understanding, the method is delineated as separate steps represented as independent blocks in FIG. 10. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

At block 1000, the process may receive an annotation criterion and a color scheme selection input from a user. The disclosed embodiment may comprise a programmable data processor operating under the control of a program to convert the display commands into data entries in an array of multi-bit data characters and words, each entry of the array corresponding to a set of descriptions of the image to be displayed. Additionally, the disclosed system may comprise a scanned-raster display device for generating illuminated points on a display surface in response to applied data signals causing the programmable data processor to perform the operations described in FIG. 10.

Based on the user input, the process may generate a target color scoring template from the color scheme at block 1010. The process, at block 1020 may search a first database to identify a set of images satisfying the annotation criterion. At block 1030, the process may ascertain whether all images in the set of images are processed. If the process determines that all images in the set of images are not yet processed, then the process may move to block 1040 to resize a given image and to generate image color spectrum histogram before determining if the histogram matches with target color scoring template at step 1050. If the histogram matches with target color scoring template, the process moves to step 1060 to add image to a pool of acceptable images. Otherwise, if the histogram does not match with target color scoring template, the process moves back to block 1030 to determine whether all images in the set if images are processed. Alternatively, if at block 1030, the process determines that all images in the set of images are processed. If it is determined that all images in the set of images are processed, then the process moves to block 1070 to dynamically display images in the pool of acceptable images to the user.

The disclosed method may advantageously be used in several applications. For example, specific meta-data color palettes could be designed for specific domains where color selection is not only associated with text, but where color selection is desired to effectuate invocation of a specific emotional reaction. These domains may include, but are not limited to film making, costume and fashion design, architecture, medical and psychological testing, and the like.

Another advantage of the disclosed method is that the method may aid in efficiently exploring and navigating a large collection of images. It is observed that using a color slider may provide instantaneous feedback to the users. In particular, the color slider feature may help users precisely identify pertinent imagery that otherwise may have been difficult to find in a large set of image search results. The disclosed method grants users an ability to manipulate the color slider in real time to cause instantaneous change in the image display. In other words, the image display is changed in response to the changed slider position to provide immediate feedback to the user. In contrast to traditional keyword searches, this feature of the disclosed invention may grant users an ability to precisely articulate a desired selection of color by moving the slider to cause change in the displayed images based on both a designated keyword and a designated color selection.

Many practical applications may present a need for matching a color to a concept. A user may design a project having various components across multiple mediums such as print, web, and the like; wherein all of the components are required to visually match. For example, the disclosed method may be used to find multiple concepts such as Health, Yoga, fitness, diet, and the like; all within a color palette of Green. The disclosed method may be beneficial in quickly exploring these concepts by color tone.

Additionally, employing the disclosed method, users may identify aesthetically pleasing imagery for a desired search. The disclosed method may display images upon considering a combination of visual attributes such as image contrast, balance, and depth of field, lines, and other attributes that are typically found to be pleasing to the eye. The traditional keyword search is unable to render the image search results based on the combination of textual and visual attributes. Users may naturally gravitate toward images with more contrast, lines, depth of field and balance in the different color ranges.

Furthermore, the disclosed invention may enable users to find "better images" or "more beautiful" images without necessarily understanding all the visual attributes that make the given images pleasing to the eye. Additionally the disclosed method may be used for several applications such as advertising, marketing, interior design, brainstorming, ideation, creative exercises. Marketers, designers and photo buyers often conduct brainstorming or ideation activities in order to create a new client portfolio.

When branding or creating visual guidelines for a new product a typical exercise may be performed to find imagery that is positively and negatively associated with the new product. Users may find images for the new product based on the content and the color that may be positively associated with the new product. The disclosed method may be advantageous in selecting images for the new product since users can simply use the color slider along with the keyword based image retrieval to find the pertinent images.

Users searching for imagery may typically perform an initial keyword search followed by a set of repeated keyword refinements until a desired result set is identified. This is a tedious process because users are challenged by creating words from visual elements. In contrast to the conventional tedious process, the disclosed method may create a visual refinement process in which users may "enjoy" the image search because users are not required to translate visual elements into words. The user's eye can process the search results faster with visual elements via visual refinement, as compared to user's ability to translate the visual elements of the images into words for keyword refinement, via repeated keyword refinement. The disclosed method may beneficially remove pressure to articulate long query string with keywords. Further, the disclosed method may cause a "color rush" phenomena which is a visceral reaction happening in users mind when users view in response to the selected user input an immediate feedback displaying the color shift occurring right before user's eyes. Users may unanimously have an emotional reaction to large color shifts displayed on the user interface.

What is claimed is:

1. A method comprising:
receiving from a user a search query comprising an annotation criterion for black and white or grayscale images from a database comprising images and an associated set of annotations describing each image, and a user-selected image attribute comprising a user-selected degree of image brightness, a user-selected degree of image balance and a user-selected degree of image light;
conducting a search of the database to identify a set of black and white or grayscale images responsive to the annotation criterion and the user-selected image attribute;
for each image responsive to the search:
resizing the image to a predefined size;
calculating each of a degree of brightness, balance, and light for the image;
generating an image color spectrum histogram for the image using the calculated degree of brightness, balance, and light for the image; and
adding the image to a pool of acceptable images if at least one of the calculated degree of brightness, balance, and light for the image of the generated image color spectrum histogram for the image corresponds to the user-selected degree of image brightness, the user-selected degree of image balance, or the user-selected degree of image light of user-selected image attribute; and
displaying images in the pool of acceptable images to the user.

2. The method of claim 1, further comprising sorting the images from the pool of acceptable images based on their respective degrees of brightness, balance, and light, and a description of the image.

3. The method of claim 1, wherein each image responsive to the search is associated with an annotation responsive to the annotation criterion of the search query.

4. The method of claim 1, further comprising accepting user input to filter searches by bright image colors, by light image colors, and by balanced image colors.

5. The method of claim 1, further comprising arranging the images in the pool of acceptable images based on a combination of visual attributes comprising at least one of image contrast, balance, depth of field, or lines on a user interface.

6. The method of claim 1, wherein each of the degrees of brightness, balance, and light for the image is calculated based on a product of a lightness of the image and chromaticity of the image.

7. A system comprising:
a memory comprising instructions; and
a processor configured to execute the instructions to:
receive from a user a search query comprising an annotation criterion for black and white or grayscale images from a database comprising images and an associated set of annotations describing each image, and a user-selected image attribute comprising a user-selected degree of image brightness, a user-selected degree of image balance and a user-selected degree of image light;
conduct a search of the database to identify a set of black and white or grayscale images responsive to the annotation criterion and the user-selected image attribute;
for each image responsive to the search:
resize the image to a predefined size;
calculate each of a degree of brightness, balance, and light for the image;
generate an image color spectrum histogram for the image using the calculated degree of brightness, balance, and light for the image; and
add the image to a pool of acceptable images if at least one of the calculated degree of brightness, balance, and light for the image of the generated image color spectrum histogram for the image corresponds to the user-selected degree of image brightness, the user-selected degree of image balance, or the user-selected degree of image light of user-selected image attribute; and display images in the pool of acceptable images to the user.

8. The system of claim 7, wherein the processor is further configured to sort the images from the pool of acceptable images based on their respective degrees of brightness, balance, and light, and a description of the image.

9. The system of claim 7, wherein each image responsive to the search is associated with an annotation responsive to the annotation criterion of the search query.

10. The system of claim 7, wherein the processor is further configured to accept user input to filter searches by bright image colors, by light image colors, and by balanced image colors.

11. The system of claim 7, wherein the processor is further configured to arrange the images in the pool of acceptable images based on a combination of visual attributes comprising at least one of image contrast, balance, depth of field, or lines on a user interface.

12. The system of claim 7, wherein each of the degrees of brightness, balance, and light for the image is calculated based on a product of a lightness of the image and chromaticity of the image.

13. A non-transitory machine-readable storage medium comprising machine-readable instructions for causing a processor to execute a method comprising receiving from a user a search query comprising an annotation criterion for black and white or grayscale images from a database comprising images and an associated set of annotations describing each image, and a user-selected image attribute comprising a user-selected degree of image brightness, a user-selected degree of image balance and a user-selected degree of image light;

conducting a search of the database to identify a set of black and white or grayscale images responsive to the annotation criterion and the user-selected image attribute;

for each image responsive to the search:
resizing the image to a predefined size;
calculating each of a degree of brightness, balance, and light for the image;
generating an image color spectrum histogram for the image using the calculated degree of brightness, balance, and light for the image; and
adding the image to a pool of acceptable images if at least one of the calculated degree of brightness, balance, and light for the image of the generated image color spectrum histogram for the image corresponds to the user-selected degree of image brightness, the user-selected degree of image balance, or the user-selected degree of image light of user-selected image attribute; and displaying images in the pool of acceptable images to the user.

14. The non-transitory machine-readable storage medium of claim 13, further comprising sorting the images from the pool of acceptable images based on their respective degrees of brightness, balance, and light, and a description of the image.

15. The non-transitory machine-readable storage medium of claim 13, wherein each image responsive to the search is associated with an annotation responsive to the annotation criterion of the search query.

16. The non-transitory machine-readable storage medium of claim 13, further comprising accepting user input to filter searches by bright image colors, by light image colors, and by balanced image colors.

17. The non-transitory machine-readable storage medium of claim 13, further comprising arranging the images in the pool of acceptable images based on a combination of visual attributes comprising at least one of image contrast, balance, depth of field, or lines on a user interface.

18. The non-transitory machine-readable storage medium of claim 13, wherein each of the degrees of brightness, balance, and light for the image is calculated based on a product of a lightness of the image and chromaticity of the image.

* * * * *